US010656302B2

(12) United States Patent
Ewe et al.

(10) Patent No.: US 10,656,302 B2
(45) Date of Patent: May 19, 2020

(54) DIELECTRIC LOGGING TOOL COMPRISING HIGH-IMPEDANCE METAMATERIALS

(71) Applicant: Halliburton Energy Services, Inc., Houston, TX (US)

(72) Inventors: Wei-Bin Ewe, Singapore (SG); Rencheng Song, Singapore (SG); Glenn Andrew Wilson, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 15/512,395

(22) PCT Filed: Nov. 18, 2015

(86) PCT No.: PCT/US2015/061323
§ 371 (c)(1),
(2) Date: Mar. 17, 2017

(87) PCT Pub. No.: WO2017/086951
PCT Pub. Date: May 26, 2017

(65) Prior Publication Data
US 2017/0276822 A1    Sep. 28, 2017

(51) Int. Cl.
*G01V 3/30* (2006.01)
*E21B 49/00* (2006.01)

(52) U.S. Cl.
CPC ............... *G01V 3/30* (2013.01); *E21B 49/00* (2013.01)

(58) Field of Classification Search
CPC ... G01V 3/00; G01V 3/02; G01V 3/04; G01V 3/06; G01V 3/08; G01V 3/088; G01V 3/10; G01V 3/101; G01V 3/102; G01V 3/104; G01V 3/105; G01V 3/107; G01V 3/108;
(Continued)

(56) References Cited

U.S. PATENT DOCUMENTS

| 4,652,829 A | * | 3/1987 | Safinya | H01Q 1/04 324/338 |
| 4,704,581 A | * | 11/1987 | Clark | H01Q 13/18 324/341 |
| 8,604,982 B2 | | 12/2013 | Achour et al. | |

(Continued)

FOREIGN PATENT DOCUMENTS

| EP | 0 198 985 A1 | 10/1986 |
| GB | 2 447 304 A | 9/2008 |

(Continued)

OTHER PUBLICATIONS

International Preliminary Report on Patentability in related PCT application No. PCT/US2015/061323 dated May 31, 2018, 12 pages.
(Continued)

*Primary Examiner* — David M Schindler
(74) *Attorney, Agent, or Firm* — Benjamin Fite; Baker Botts L.L.P.

(57) ABSTRACT

An example logging tool may include at least one transmitter antenna and at least one receiver antenna. A first high-impedance metamaterial may be disposed between the transmitter antenna and the receiver antenna. The first high-impedance metamaterial may include a periodic arrangement of patches, each of the patches being electrically coupled to a ground plane using a via.

23 Claims, 3 Drawing Sheets

(58) Field of Classification Search
CPC ... G01V 3/18; G01V 3/20; G01V 3/22; G01V 3/24; G01V 3/26; G01V 3/28; E21B 49/00
See application file for complete search history.

(56) References Cited

U.S. PATENT DOCUMENTS

| | | |
|---|---|---|
| 2005/0127917 A1 | 6/2005 | Barber |
| 2008/0224705 A1* | 9/2008 | Simon ................ G01V 3/30 324/333 |
| 2011/0221443 A1 | 9/2011 | Bittar et al. |
| 2013/0241561 A1 | 9/2013 | Allen |
| 2014/0298900 A1* | 10/2014 | Clarke ................ E21B 49/00 73/152.55 |
| 2015/0088426 A1 | 3/2015 | Tang |
| 2015/0218941 A1 | 8/2015 | Clarke et al. |
| 2016/0252644 A1* | 9/2016 | Fouda ................ G01V 3/28 324/355 |
| 2017/0090061 A1* | 3/2017 | Fouda ................ G01R 29/08 |
| 2017/0254917 A1* | 9/2017 | Fouda ................ G01V 3/28 |

FOREIGN PATENT DOCUMENTS

| | | |
|---|---|---|
| WO | 2009/059190 A2 | 5/2009 |
| WO | 2013/072844 A1 | 5/2013 |
| WO | 2014/027322 A2 | 2/2014 |

OTHER PUBLICATIONS

Bittar, Michael, et al. "A modern microwave formation evaluation sensor and its applications in reservoir evaluation." SPWLA 51st Annual Logging Symposium. Society of Petrophysicists and Well-Log Analysts, 2010.

Nguyen, Tai Thanh, et al. "Design of a wideband mushroom-like electromagnetic bandgap structure with magneto-dielectric substrate." resonance 150.1 (2009): 0.

Iravani, Baharak Mohajer. Electromagnetic interference reduction using electromagnetic bandgap structures in packages, enclosures, cavities, and antennas. PhD Dissertation, University of Maryland. ProQuest, 2007.

Sandora, John. "Isolation improvement with electromagnetic band gap surfaces." Lincoln Laboratory Journal 19.1 (2012).

Sievenpiper, Dan, et al. "High-impedance electromagnetic surfaces with a forbidden frequency band." IEEE Transactions on Microwave Theory and techniques 47.11 (1999): 2059-2074.

International Search Report and Written Opinion issued in related PCT Application No. PCT/US2015/061323 dated Aug. 16, 2016, 16 pages.

* cited by examiner

DIELECTRIC LOGGING TOOL COMPRISING HIGH-IMPEDANCE METAMATERIALS

CROSS-REFERENCE TO RELATED APPLICATION

The present application is a U.S. National Stage Application of International Application No. PCT/US2015/061323 filed Nov. 18, 2015, which is incorporated herein by reference in its entirety for all purposes.

BACKGROUND

This disclosure generally relates to logging tools for characterizing downhole formation characteristics. In particular, this disclosure relates to dielectric logging tools that includes a high-impedance metamaterial disposed between the transmitter and receiver antennae of the dielectric tool.

The basic techniques for electromagnetic logging for earth formations are well known. For instance, using a logging tool to determine resistivity (or its inverse, conductivity) of earth formations adjacent a borehole has long been a standard and important technique in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

BRIEF DESCRIPTION OF THE DRAWINGS

These drawings illustrate certain aspects of certain embodiments of the present disclosure. They should not be used to limit or define the disclosure.

Figure 1:
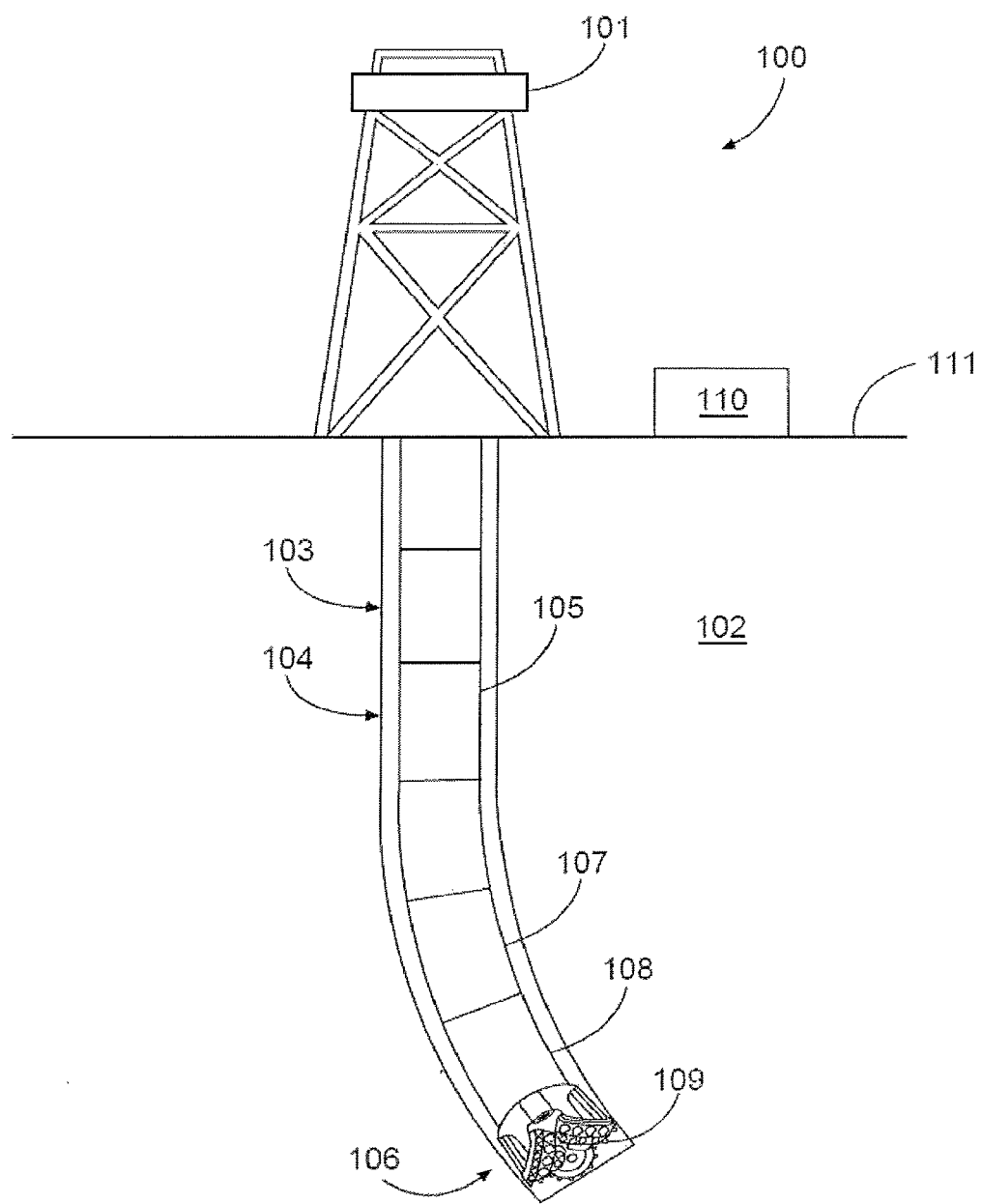
FIG. 1 illustrates an example downhole drilling system, in accordance with embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes dielectric logging tools that include a high-impedance material disposed between the transmitter and receiver antennae of the dielectric tool. In particular, high-impedance metamaterials may be used in a dielectric logging tool to suppress surface currents and thus minimize unwanted direct coupling between transmitter and receiver antennae. In addition, the use of such materials may allow for electronic steering of the transmitted electromagnetic field. Metamaterials may refer to materials that are engineered to have particular properties, such as electromagnetic properties. Metamaterials may be engineered, for example, to have properties not found in naturally-occurring materials. An example metamaterial is an artificial magnetic conductor, which is a structure that may behave as a perfect magnetic conductor. High-impedance metamaterials, in some embodiments may include materials engineered to have an electromagnetic bandgap that prohibits electromagnetic field propagation in the designed frequency band. The metamaterial may include a periodic arrangement of metal or dielectric materials, wherein the arrangement determines the electromagnetic bandgap or other properties of the metamaterial.

Dielectric logging tools may be used to provide high resolution porosity, salinity, rock texture characteristics, or any other suitable characteristics of a formation, which may be useful for formation evaluation. Signals in current dielectric logging tools may be contaminated by surface current effects, and coupling between the transmitter and receiver antennae that are unrelated to the formation characteristics under evaluation. By introducing high-impedance metamaterials as disclosed herein, the direct coupling between the transmitter and receiver antennae may be minimized, and the depth of investigation (DOI) can be enhanced by electronically steering the radiation patterns of the transmitter and/or receiver antennae deeper into the formation.

To facilitate a better understanding of the present disclosure, the following examples of certain embodiments are given. In no way should the examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting. Embodiments of the present disclosure and its advantages are best understood by referring to FIGS. 1 through 4, where like numbers are used to indicate like and corresponding parts.

FIG. 1 illustrates an example downhole drilling system 100, in accordance with embodiments of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107 which may include logging tools (e.g., dielectric logging tools in accordance with the present disclosure). A control unit 110 located at the surface 111 may include a processor and memory device, and may communicate with elements of the BHA 106 (e.g., dielectric logging tools in the LWD/MWD apparatus 107). The control unit 110 may receive data from and send control signals to the BHA 106 or components thereof. Additionally, in some embodiments, at least one processor and memory device may be located downhole within the BHA 106 for the same purposes. The LWD/MWD apparatus 107 may log the formation 102 (i.e., sample, test, and/or otherwise obtain information about the formation) both while the wellbore 103 is being drilled, and after the wellbore is drilled to provide information regarding ongoing subterranean operations.

Modifications, additions, or omissions may be made to FIG. 1 without departing from the scope of the present disclosure. For example, dielectric logging tools in accordance with the present disclosure may be located in steering assembly 108 and/or drill bit 109 in addition to, or instead of, in LWD/MWD apparatus 107 as described above. As another example, components may be added to downhole drilling system 100 or removed from downhole drilling system 100 without departing from the scope of the present disclosure.

Figure 2A:
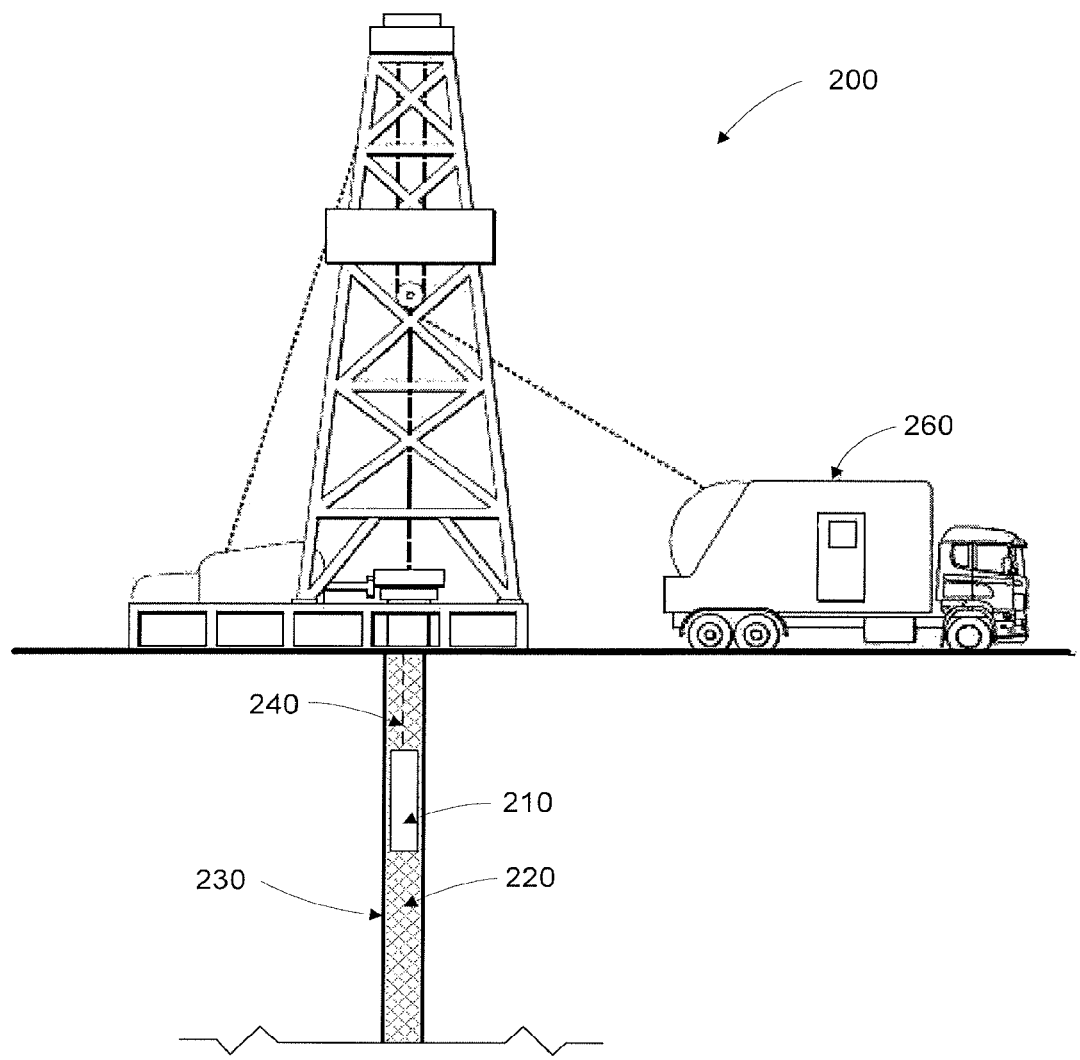
FIG. 2A illustrates an example downhole logging system used in a hydrocarbon drilling environment in accordance with embodiments of the present disclosure.
Figure 2B:
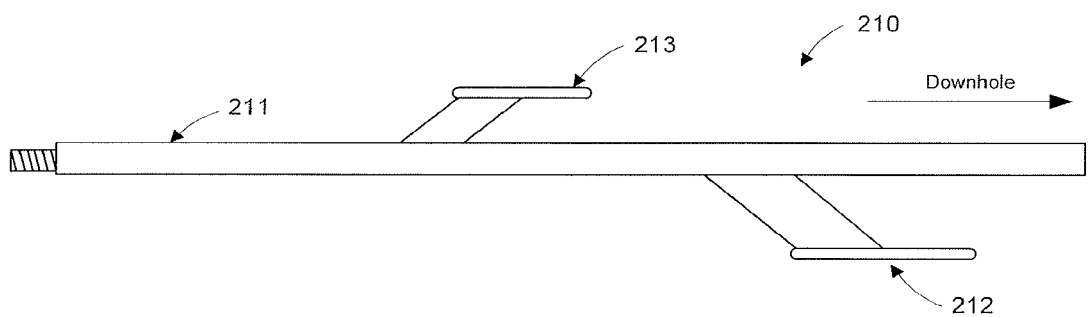
FIG. 2B illustrates an example downhole inspection tool in accordance with embodiments of the present disclosure.

FIG. 2A illustrates an example downhole logging system 200 used in a hydrocarbon drilling environment in accordance with embodiments of the present disclosure. Operations in a wellbore (e.g., logging or other data collection) may be conducted using downhole inspection tool 210 when some or all of a drill string has been removed from the wellbore. Downhole inspection tool 210 may include one or more logging tools (e.g., dielectric logging tools or other suitable downhole sensors) that may be suspended into wellbore 220 (which may be formed by one or more casings 230) by conveyance 240 (e.g., wireline, slickline, or coiled tubing). For example, in certain embodiments, downhole inspection tool 210 may comprise a shaft 211 with a dielectric logging tool 212 and a microlog (ML) or micro-spherically focused log (MSFL) tool 213 coupled thereto, as shown in FIG. 2B. ML/MSFL tool 213 may be configured to determine resistivity of a formation, and dielectric logging tool 212 may be configured to determine a dielectric constant of the formation. In some embodiments, dielectric logging tool 212 and ML/MSFL tool 213 may be used to determine water saturation in a formation, such as flushed water zone saturation. An example dielectric logging tool 212 according to the present disclosure is described further below with respect to FIG. 3. Downhole inspection tool 210 may be configured to extend dielectric logging tool 212 and/or ML/MSFL tool 213 away from shaft 211 during logging operations, such that dielectric logging tool 212 and ML/MSFL tool 213 are located closer to the formation during such operations.

Downhole inspection tool 210 may be communicatively coupled to conveyance 240, which may contain conductors for transporting power to downhole inspection tool 210 and signals from logging tools included therein to logging facility 260. However, conveyance 240 may alternatively lack a conductor, as is often the case using slickline or coiled tubing. Logging facility 260 (shown in FIG. 2A as a truck, although it may be any other structure) may collect measurements from downhole inspection tool 210, and may include computing facilities for controlling, processing, or storing the measurements communicated thereto. The computing facilities may include a processor and a memory device and may be communicatively coupled to the components of downhole logging system 200 through any suitable means.

Modifications, additions, or omissions may be made to FIGS. 2A-2B without departing from the scope of the present disclosure. For example, FIG. 2A illustrates components of downhole logging system 200 in a particular configuration. However, any suitable configuration of components for logging a wellbore may be used. Furthermore, fewer components or additional components beyond those illustrated may be included in downhole logging system 200 without departing from the scope of the present disclosure. As another example, although FIG. 2B illustrates downhole inspection tool 210 as comprising a single dielectric logging tool 212 and ML/MSFL tool 213, additional dielectric logging tools 212, ML/MSFL tools 213, or other tools (e.g., temperature sensors) may be coupled to downhole inspection tool 210 without departing from the scope of the present disclosure.

Figure 3:
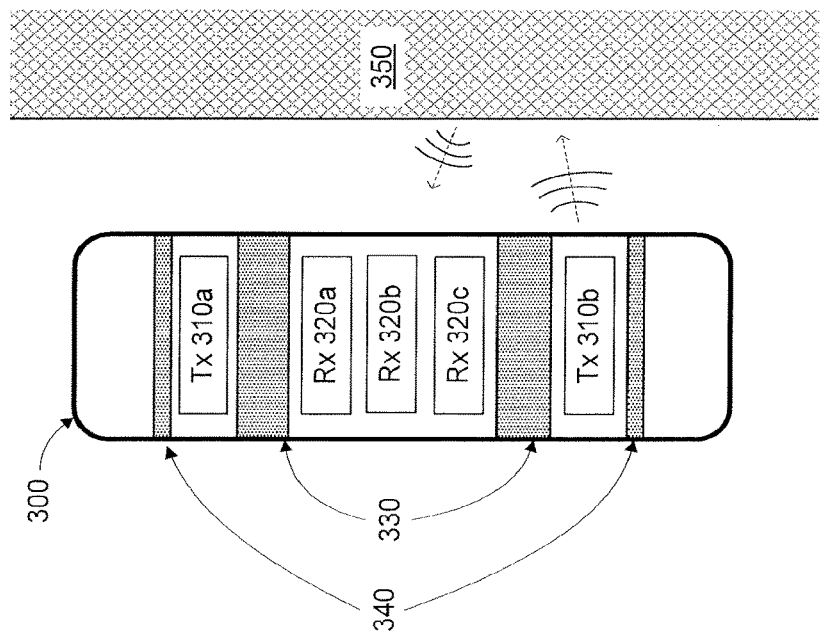
FIG. 3 illustrates an example dielectric logging tool in accordance with embodiments of the present disclosure.

FIG. 3 illustrates an example dielectric logging tool 300 in accordance with embodiments of the present disclosure. Dielectric logging tool 300 may be located on portions of a downhole drilling system, such as downhole drilling system 100 of FIG. 1, or on tools located wireline logging tools, such as downhole inspection tool 210 of FIGS. 2A-2B. For example, dielectric logging tool 300 may be located on LWD/MWD apparatus 107 of FIG. 1 or on downhole inspection tool 210 of FIGS. 2A-2B. In particular embodiments, dielectric logging tool 300 may be used to determine one or more characteristics of a formation, such as the resistivity or the complex dielectric constant of the formation.

Dielectric logging tool 300 includes transmitter antennae 310 and receiver antennae 320. During logging operations, dielectric logging tool 300 may be placed into a wellbore disposed within a formation. In particular embodiments, dielectric logging tool 300 may be placed into the wellbore with minimum stand-off from the formation, and transmitter antennae 310 may produce and propagate omni-directional electromagnetic waves into the formation. The electromagnetic waves may be of any suitable frequency, and may be 1000 MHz in certain embodiments. Receiver antennae 320 may receive response signals based on the interaction of the electromagnetic waves generated by transmitter antennae 310 with the formation, and the signal amplitude attenuation and/or phase shift due to the formation may be measured based on the received response signals.

In particular embodiments, the transmitter antennae 310 and receiver antennae 320 of dielectric logging tool 300 may be located on a single metallic pad and may thus share a common ground plane. For example, the transmitter antennae 310 and receiver antennae 320 may be dielectric cavity antennae embedded in a metallic pad. In tools without high-impedance metamaterials located between the transmitter antennae 310 and receiver antennae 320 (e.g., high-impedance metamaterials 330 of FIG. 3), the common ground configuration may enable unwanted direct coupling between transmitter antennae 310 and receiver antennae 320 through surface currents. The information generated by this direct coupling does not contain useful information about the formation, and accordingly may be suppressed or minimized. Accordingly, aspects of the particular disclosure may include high-impedance metamaterials placed between transmitter antennae 310 and receiver antennae 320 in order to attenuate such surface currents and remove unwanted direct coupling therebetween. Referring to FIG. 3, high-impedance metamaterials 330 may be placed between the transmitter antennae 310 and receiver antennae 320 in order to block surface currents between (and thus attenuate or remove direct coupling between) transmitter antennae 310 and receiver antennae 320.

Furthermore, aspects of the particular disclosure may include high-impedance metamaterials placed on both sides of transmitter antennae 310 and/or receiver antennae 320 in order to configure and optimize the directionality of the electromagnetic waves emitted from (for transmitter antennae 310) or directed to (for receiver antennae 320) the respective antennae. For example, referring to FIG. 3, high-impedance metamaterials 340 may be positioned on the opposite side of transmitter antennae 310 from receiver antennae 320 (in addition to high-impedance metamaterials 330) in order to "steer" the electromagnetic waves emitted from transmitter antennae 310 in a particular direction. Similarly, based on reciprocity, high-impedance metamaterials 330 may be configured to direct electromagnetic waves toward receiver antennae 320 in a particular direction. In addition, although not illustrated, high-impedance metamaterials may be placed between each receiver antenna of receiver antennae 320.

High-impedance metamaterials 330 and 340 may be placed in any suitable location on dielectric logging tool 300, such as on top of dielectric logging tool 300 or inside dielectric logging tool 300. For example, in order to preserve the surface flatness of dielectric logging tool 300, the high-impedance metamaterials 330 and 340 may be embedded into the metallic pad on which transmitter antennae 310 and receiver antennae 320 are located. In some embodiments, the top surface of the high-impedance metamaterials 330 and 340 may be coated with a thin (e.g., 2 mm) layer of highly resistive dielectric material to provide mechanical integrity from abrasion against the wellbore wall.

Furthermore, high-impedance metamaterials 330 and 340 may be configured and/or placed in any suitable location on dielectric logging tool 300 based on a desired operation of dielectric logging tool 300. For example, the distances between transmitter antennae 310 and high-impedance metamaterials 330 and 340 may be chosen such that surface currents of particular frequencies are attenuated and such that the direction of the transmitted electromagnetic waves is at a particular angle with respect to transmitter antennae 310. For example, in certain embodiments, high-impedance metamaterials 330 and 340 may be placed at distances of 20 mm and 3 mm, respectively, from transmitter antennae 310 such that transmitter antennae 310 may emit electromagnetic waves at an angle of approximately 40° from the surface normal.

Figure 4A:
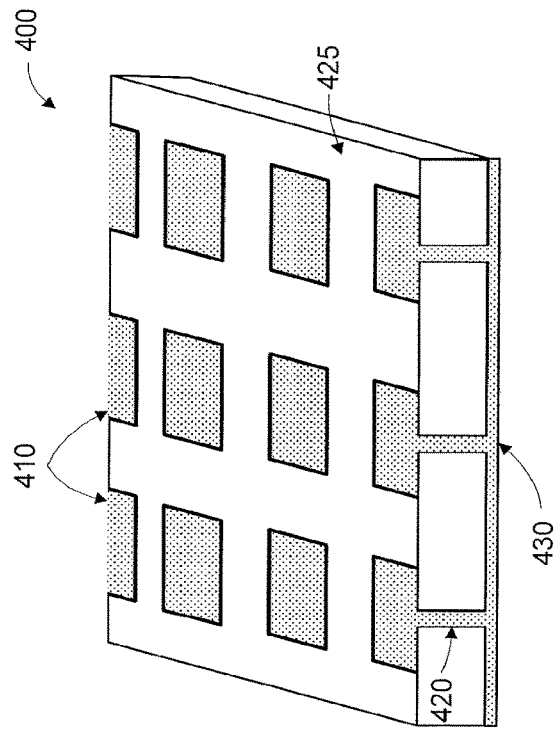
FIGS. 4A-4B illustrate perspective views of an example high-impedance metamaterial in accordance with embodiments of the present disclosure.
Figure 4B:
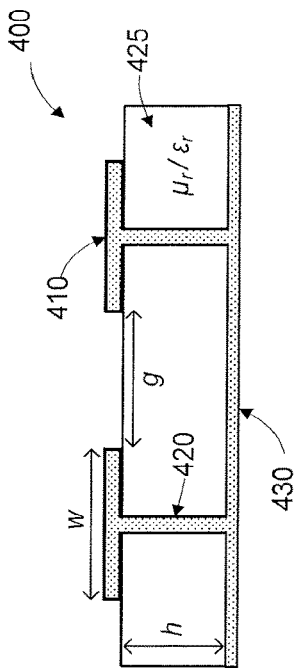

The high-impedance metamaterials may consist, in certain embodiments, of periodic metallic and dielectric elements arranged to create an electromagnetic bandgap that prohibits field propagation (and thus, surface currents) in the designed frequency band. The specific electromagnetic bandgap of the metamaterial may depend on the particular application. In certain embodiments, the electromagnetic bandgap of the metamaterial may match the frequency of the electromagnetic waves emitted from transmitter antennae 310. Some example electromagnetic bandgaps for the high-impedance metamaterials may include, for example, approximately 10 MHz to 5 GHz or 10 MHz to 50 GHz. In certain embodiments where wide bandgaps are desired, multiple high-impedance metamaterials comprising smaller, overlapping bandgaps may be used in combination (e.g., coupled together) to create a higher overall bandgap for the metamaterial combination. An example metamaterial configuration is shown in FIGS. 4A-4B. However, any suitable metamaterial configuration may be used.

Modifications, additions, or omissions may be made to FIG. 3 without departing from the scope of the present disclosure. For example, FIG. 3 illustrates components of dielectric logging tool 300 in a particular configuration. However, any suitable configuration of components for logging a wellbore may be used. Furthermore, fewer components or additional components beyond those illustrated may be included in dielectric logging tool 300 without departing from the scope of the present disclosure.

FIGS. 4A-4B illustrate perspective views of an example high-impedance metamaterial 400 in accordance with embodiments of the present disclosure. In particular, FIG. 4A illustrates an example Sievenpiper metamaterial (also referred to as a "mushroom-like" metamaterial or Sievenpiper structure) and FIG. 4B illustrates a side view of the Sievenpiper metamaterial illustrated in FIG. 4A. High-impedance metamaterial 400 comprises patches 410, vias 420, and ground plane 430, each of which may be composed of metal, dielectric materials, or any suitable combination thereof. Vias 420 may electrically couple patches 410 with ground plane 430 through dielectric substrate 425. Although shown in a particular configuration, it will be understood that any suitable configuration of patches 410 (with different sizes, shapes, or spacing) may be used to create a suitable metamaterial comprising particular characteristics (e.g., a certain electromagnetic bandgap as discussed above).

The Sievenpiper metamaterial illustrated in FIGS. 4A-4B may be modeled as a parallel resonant LC circuit, having sheet inductance L determined using Equation (1):

$$L = \mu_r \mu_0 h \qquad (1)$$

The sheet capacitance C can be determined using the structural parameters as and the equivalent sheet capacitance can be determined using Equation (2):

$$C = \frac{w \varepsilon_0 (\varepsilon_{r1} + \varepsilon_{r2})}{\pi} \cosh^{-1}\left(\frac{w+g}{g}\right) \qquad (2)$$

The resulting resonant frequency $f_r$ of the parallel resonant LC circuit can therefore be determined using Equation (3):

$$f_r = \frac{1}{2\pi \sqrt{LC}} \qquad (3)$$

The resonant frequency may be considered as the center frequency of the electromagnetic bandgap of the Sievenpiper metamaterial, and the associated bandgap of the Sievenpiper metamaterial may be approximately 30% -40% around this resonant frequency. Example parameters for the structure of the high-impedance metamaterial 400 may include w=8 mm, g=1 mm, and h=2 mm, with the relative permittivity and permeability of the substrate being $\varepsilon_r$=11.5 and $\mu_r$=12, respectively.

Modifications, additions, or omissions may be made to FIGS. 4A-4B without departing from the scope of the present disclosure. For example, FIGS. 4A-4B illustrate a particular arrangement of patches 410 and vias 420 that form a Sievenpiper metamaterial. However, any suitable periodic arrangement of patches 410 and vias 420 for creating a high-impedance metamaterial or artificial magnetic conductor surface may be used. For example, different sizes, shapes or arrangements of patches 410 may be used, along with different locations of via 420 with respect to patches 410 (e.g., non-centered vias).

To provide illustrations of one or more embodiments of the present disclosure, the following examples are provided.

An example logging tool may include at least one transmitter antenna and at least one receiver antenna. A first high-impedance metamaterial may be disposed between the transmitter antenna and the receiver antenna.

In one or more embodiments described in the preceding paragraph, the first high-impedance metamaterial may comprises a periodic arrangement of patches, each of the patches being electrically coupled to a ground plane using a via.

In one or more embodiments described in the preceding paragraph, the via is coupled to each patch in the center of the patch.

In one or more embodiments described in the preceding three paragraphs, the first high-impedance metamaterial may be a Sievenpiper metamaterial.

In one or more embodiments described in the preceding four paragraphs, the first high-impedance metamaterial may have an electromagnetic bandgap property.

In one or more embodiments described in the preceding five paragraphs, the electromagnetic bandgap property may include an electromagnetic bandgap of 10 MHz to 5 GHz.

In one or more embodiments described in the preceding six paragraphs, the logging tool may further comprise a second high-impedance metamaterial and a third high-impedance metamaterial disposed on opposite sides of at least one of the transmitter antenna and the receiver antenna.

In one or more embodiments described in the preceding paragraph, the second high-impedance metamaterial and the third high-impedance metamaterial are configured to cause electromagnetic waves to be directed in a particular direction.

In one or more embodiments described in the preceding eight paragraphs, the first high-impedance metamaterial may comprise the second high-impedance metamaterial.

In one or more embodiments described in the preceding nine paragraphs, the first high-impedance metamaterial comprises a plurality of metamaterials coupled together.

In one or more embodiments described in the preceding ten paragraphs, the logging tool may further comprise a metal pad, wherein the first high-impedance metamaterial is disposed on or embedded in the metal pad.

In one or more embodiments described in the preceding paragraph, the logging tool may further comprises a shaft to which the metal pad is coupled, and a microlog (ML) tool coupled to the shaft.

In one or more embodiments described in the preceding two paragraphs, the logging tool may further comprises a dielectric coating disposed on the metallic pad such that each of the at least one transmitter antenna, the at least one receiver antenna, and the first high-impedance metamaterial are disposed between the metallic pad and the dielectric coating.

An example method may include positioning a logging tool in a hydrocarbon wellbore within a subterranean formation, and emitting electromagnetic waves into the subterranean formation from a transmitter antenna disposed on the logging tool. Responsive electromagnetic waves from the subterranean formation may be received at a receiver antenna disposed on the logging tool, wherein a first high-impedance metamaterial is positioned between the transmitter antenna and the receiver antenna.

In one or more embodiments described in the preceding paragraph, the first high-impedance metamaterial comprises a periodic arrangement of patches, each of the patches being electrically coupled to a ground plane using a via.

In one or more embodiments described in the preceding paragraph, the via is coupled to each patch in the center of the patch.

In one or more embodiments described in the preceding three paragraphs, the first high-impedance metamaterial may be a Sievenpiper metamaterial.

In one or more embodiments described in the preceding four paragraphs, the first high-impedance metamaterial may have an electromagnetic bandgap property.

In one or more embodiments described in the preceding five paragraphs, the electromagnetic bandgap property includes an electromagnetic bandgap of 10 MHz to 5 GHz.

In one or more embodiments described in the preceding six paragraphs, the dielectric logging tool further may comprise a second high-impedance metamaterial and a third high-impedance metamaterial disposed on opposite sides of the transmitter antenna and/or the receiver antenna.

In one or more embodiments described in the preceding paragraph, the second high-impedance metamaterial and the third high-impedance metamaterial are configured to cause electromagnetic waves to be directed in a particular direction.

In one or more embodiments described in the preceding eight paragraphs, the first high-impedance metamaterial comprises the second high-impedance metamaterial.

In one or more embodiments described in the preceding nine paragraphs, the first high-impedance metamaterial comprises a plurality of metamaterials coupled together.

In one or more embodiments described in the preceding ten paragraphs, the first high-impedance metamaterial is disposed on or embedded in the metallic pad.

In one or more embodiments described in the preceding eleven paragraphs, a dielectric coating may be disposed on the metal pad such that each of the at least one transmitter antenna, the at least one receiver antenna, and the first high-impedance metamaterial are disposed between the metallic pad and the dielectric coating.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "uphole" as used herein means along the drill string or the hole from the distal end towards the surface, and "downhole" as used herein means along the drill string or the hole from the surface towards the distal end.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

The present disclosure is well adapted to attain the ends and advantages mentioned, as well as those that are inherent therein. The particular embodiments disclosed herein are illustrative only, as the present disclosure may be modified and practiced in different but equivalent manners apparent to those skilled in the art having the benefit of the teachings herein. In the interest of clarity, not all features of an actual implementation may he described in this specification. It will of course be appreciated that in the development of any actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

What is claimed is:

1. A logging tool, comprising:
a first transmitter antenna;
a second transmitter antenna;
a plurality of receiver antennas adjacent to each other and disposed between the first transmitter antenna and the second transmitter antenna, wherein the first transmitter antenna, the second transmitter antenna and the plurality of receiver antennas share a common ground plane; and
a first metamaterial disposed on the logging tool between the first transmitter antenna and a first receiver antenna of the plurality of receiver antennas and a second metamaterial disposed on the logging tool between the second transmitter antenna and a second receiver antenna of the plurality of receiver antennas to block one or more surface currents between the first and second transmitter antennas and the plurality of receiver antennas and to at least one of attenuate or remove direct coupling between the first and second transmitter antennas and the plurality of receiver antennas, wherein the first metamaterial is disposed at a distance from both the first transmitter antenna and the first receiver antenna and the second metamaterial is disposed at a distance from both the second transmitter antenna and the second receiver antenna.

2. The logging tool of claim 1, wherein one or more of the first metamaterial and the second metamaterial comprises a periodic arrangement of patches, each of the patches being electrically coupled to a ground plane using a via.

3. The logging tool of claim 2, wherein the via is coupled to each patch in the center of the patch.

4. The logging tool of claim 1, wherein one or more of the first metamaterial and the second metamaterial comprises a Sievenpiper metamaterial.

5. The logging tool of claim 1, wherein one or more of the first metamaterial and the second metamaterial has an electromagnetic bandgap property.

6. The logging tool of claim 5, wherein the electromagnetic bandgap property includes an electromagnetic bandgap of 10 MHz to 5 GHz.

7. The logging tool of claim 1, further comprising a third metamaterial disposed on the logging tool between a first end of the logging tool and the first transmitter antenna and a fourth metamaterial disposed on the logging tool between a second end of the logging tool and the second transmitter antenna.

8. The logging tool of claim 7, wherein the third metamaterial and the fourth metamaterial are configured to cause electromagnetic waves to be directed in a particular direction.

9. The logging tool of any one of claim 2, wherein the vias electrically couple each of the patches to the ground plane through a dielectric substrate.

10. The logging tool of claim 1, further comprising a metallic pad, wherein one or more of the at least the first metamaterial and the second metamaterial is disposed on or embedded in the metallic pad, the metallic pad forms the common ground plane.

11. The logging tool of claim 10, further comprising a shaft to which the metallic pad are coupled, and a microlog (ML) tool coupled to the shaft.

12. The logging tool of claim 10, further comprising a dielectric coating disposed on the metallic pad such that each of the first transmitter antenna, the second transmitter antenna, the plurality of receiver antennas, the first metamaterial and the second metamaterial are disposed between the metallic pad and the dielectric coating.

13. A method, comprising:
positioning a logging tool in a wellbore within a subterranean formation;
emitting electromagnetic waves into the subterranean formation from at least one of a first transmitter antenna and a second transmitter antenna disposed on the logging tool; and
receiving responsive electromagnetic waves from the subterranean formation by at least one of a plurality of receiver antennas disposed on the logging tool, wherein a first metamaterial is disposed on the logging tool between antenna and between the second transmitter and a first receiver antenna of the plurality of receiver antennas and a second metamaterial is disposed between the second transmitter antenna and a second receiver antenna of the plurality of receiver antennas to block one or more surface currents between the first and second transmitter antennas and the plurality of receiver antennas and to one of attenuate or remove direct coupling between the first transmitter antenna and the first receiver antenna and the second transmitter antenna and the second receiver antenna, wherein the first metamaterial is disposed at a distance from both the first transmitter antenna and the first receiver antenna, and wherein the first transmitter antenna, the second transmitter antenna and the plurality of receiver antennas share a common ground plane.

14. The method of claim 13, wherein one or more of the first metamaterial and the second metamaterial comprises a periodic arrangement of patches, each of the patches being electrically coupled to a ground plane using a via.

15. The method of claim 14, wherein the via is coupled to each patch in the center of the patch.

16. The method of claim 13, wherein one or more of the first metamaterial and the second metamaterial comprises a Sievenpiper metamaterial.

17. The method of claim 13, wherein one or more of the first metamaterial and the second metamaterial has an electromagnetic bandgap property.

18. The method of claim 17, wherein the electromagnetic bandgap property includes an electromagnetic bandgap of 10 MHz to 5 GHz.

19. The method of claim 13, wherein the logging tool comprises a third metamaterial disposed on the logging tool between a first end of the logging tool and the first transmitter antenna and a fourth metamaterial disposed on the logging tool between a second end of the logging tool and the second transmitter antenna.

20. The method of claim 19, wherein
emitting electromagnetic waves into the subterranean formation from at least one of the first and second transmitter antennas disposed on the logging tool comprises directing the emitted electromagnetic waves in a particular direction through the third metamaterial and the fourth metamaterial; or
receiving responsive electromagnetic waves from the subterranean formation at the plurality of receiver antennas disposed on the logging tool comprises directing the emitted electromagnetic waves in a particular direction through the third metamaterial and the fourth metamaterial.

21. The method of claim 13, wherein the via electrically couples each of the patches to the ground plane through a dielectric substrate.

22. The method of claim 13, wherein the logging tool comprises a metallic pad and wherein at least one of the first metamaterial and the second metamaterial are disposed on or embedded in the metallic pad, the metallic pad forms the common ground plane.

23. The method of claims 22, wherein the logging tool comprises a dielectric coating disposed on the metallic pad such that each of the transmitter antenna, the receiver antenna, and the first metamaterial are disposed between the metallic pad and the dielectric coating.

* * * * *